United States Patent Office 3,582,291
Patented June 1, 1971

3,582,291
SOLID IONIC CONDUCTORS
Geoffrey W. Mellors, Strongsville, Ohio, assignor to Union Carbide Corporation, New York, N.Y.
No Drawing. Continuation-in-part of abandoned application Ser. No. 805,002, Mar. 6, 1969. This application Feb. 4, 1970, Ser. No. 8,709
Int. Cl. C01c 3/10
U.S. Cl. 23—359       5 Claims

ABSTRACT OF THE DISCLOSURE

Novel compounds which are solid ionic conductors at room temperature are disclosed. These compounds conform to the general formula $MCN \cdot 4AgI$ or modifications thereof wherein M is potassium, rubidium, cesium or mixtures thereof.

RELATED APPLICATION

This application is a continuation-in-part of U.S. Ser. No. 805,002 filed Mar. 6, 1969, now abandoned.

SUMMARY OF THE INVENTION

This invention relates to solid ionic conductors.

Ionic conductivity is usually associated with the flow of ions through an aqueous solution of metallic salts. In the vast majority of practical uses of ionic conductors, i.e. as electrolytes for dry cell batteries, the aqueous solution is immobilized in a paste or gelled matrix to overcome the difficulties associated with handling and packaging a liquid. However, even after immobilization, the system is still subject to possible leakage, has a limited shelf life due to drying out or crystallization of the salts and is suitable for use only within a limited temperature range corresponding to the liquid range of the electrolyte. In addition, the necessity of including a large volume of immobilizing material has hindered the aims of miniaturization.

In attempting to overcome the shortcomings of liquid systems, investigators have surveyed a large number of solid compounds hoping to find compounds which are solid at room temperature and have specific conductances approaching those exhibited by the commonly used liquid systems. Most solids have specific conductances at room temperature (20° C.) in the range of $10^{-6}$ to $10^{15-}$ $ohm^{-1}$ $cm.^{-1}$ as compared to aqueous solutions of salts which nominally have a specific conductance of 0.5 to 0.8 $ohm^{-1}$ $cm.^{-1}$.

It has now been discovered that certain novel metallic salts which are solids at room temperature have specific conductances sufficiently high to permit their use in practical battery applications.

The compounds of the present invention conform to the general formula $$MCN \cdot 4AgI$$

wherein M is potassium, rubidium or cesium or a mixture thereof. The MCN component of the formula may be, therefore, potassium cyanide, rubidium cyanide or cesium cyanide alone or in any combination so long as the mole ratio of total alkali cyanide to silver iodide is 1:4. Illustrative of the novel compounds of the invention are $$KCN \cdot 4AgI, RbCN \cdot 4AgI, CsCN \cdot 4AgI$$

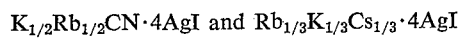

which may be formally written $KAg_4I_4CN$, $RbAg_4I_4CN$, $CsAg_4I_4Cn$, $KRbAg_8I_8(CN)_2$ and $RbKCsAg_{12}I_{12}(CN)_3$, respectively, and descriptively named monopotassium tetrasilver tetraiodide monocyanide, monorubidium tetrasilver tetraiodide monocyanide, monocesium tetrasilver tetraiodide monocyanide, monorubidium monopotassium octosilver octoiodide dicyanide and monorubidium monopotassium monocesium dodecasilver dodecaiodide tricyanide, respectively.

Monopotassium tetrasilver tetraiodide monocyanide can be prepared by the direct reaction of potassium cyanide with silver iodide in the ratio of 1 mole of potassium cyanide to 4 moles of silver iodide. The resulting compound is a gray-green solid at room temperature and has a conductance mechanism wholly ionic in nature at room temperature. The current is carried predominantly by the silver ions and the specific conductance of the compound at 25° C. is $1.4 \times 10^{-1}$ $ohm^{-1}$ $cm.^{-1}$.

Monorubidium tetrasilver tetraiodide monocyanide can be prepared by the reaction of rubidium iodide, silver cyanide and silver iodide in the ratio of 1 mole of rubidium iodide to 1 mole of silver cyanide to 3 moles of silver iodide. The resulting compound is creamy-yellow in color and has a conductance mechanism wholly ionic in nature at room temperature. The specific conductance of this compound at 25° C. is $1.8 \times 10^{-1}$ $ohm^{-1}$ $cm.^{-1}$.

Monocesium tetrasilver tetraiodide monocyanide can be prepared by the reaction of 1 mole of cesium iodide with 1 mole of silver cyanide and 3 moles of silver iodide. The resulting compound is grayish in color and has a specific conductance at 25° C. of $9.1 \times 10^{-4}$ $ohm^{-1}$ $cm.^{-1}$.

Monopotassium monorubidium octosilver octoiodide dicyanide is prepared by the reaction of 1 mole of rubidium iodide with 1 mole of monopotassium monosilver dicyanide and 7 moles of silver iodide. The resulting compound is a gray solid at room temperature and displays a specific conductance of $1.5 \times 10^{-1}$ $ohm^{-1}$ $cm.^{-1}$ at 25° C.

Monorubidium monopotassium monocesium dodecasilver dodecaiodide tricyanide is prepared by the reaction under nitrogen 1 mole of rubidium iodide, 1 mole of potassium iodide, 1 mole of cesium iodide, 3 moles of silver cyanide and 9 moles of silver iodide. The resulting compound is a solid at room temperature and displays a specific conductance of $1.9 \times 10^{-2}$ $ohm^{-1}$ $cm.^{-1}$ at 25° C.

The ionic conductivity of the compounds of the present invention greatly exceeds that of silver iodide alone. In addition, the incorporation of cyanide molecules into the compounds increases the stability of these compounds over pure iodide solid conductors, particularly with respect to stability in moist atmospheric conditions at or near room temperature. Moreover, the physical and electrochemical properties of the compounds of the present invention can be modified by forming solid solutions of these compounds with each other or with one or more of the elements contained in the compound. For example, if we consider modifications of the compound monopotassium tetrasilver tetraiodide monocyanide as falling within a ternary diagram of silver iodide, potassium cyanide and silver cyanide, it appears that compositions along lines originating at the silver iodide vertex contain conducting materials with maximum conductance at about 80 mole percent silver iodide. Generally speaking, compositions along the silver iodide-silver cyanide binary are of minute conductance and the conductance of these compositions increases upon addition of potassium cyanide. Maximum conductance and the formation of the novel compounds according to the invention is achieved at a ratio of total alkali cyanide to silver iodide of 1:4. However, as will become clear from the ensuing disclosure, compositions which are modifications of the 1:4 ratio have specific conductances sufficiently high to permit their use in special battery applications. Suitable electrolytes are obtained within the range of alkali cyanide to silver iodide of from 1:19 to 1:1. Typical specific conductances obtained by modifications of monopotassium tetrasilver tetraiodide monocyanide within the ternary described above are set forth in the following table:

TABLE 1

| Compositions: | Specific conductance (25° C.) |
|---|---|
| 2AgI—KAg(CN)$_2$ | 2.9×10$^{-2}$ ohm$^{-1}$ cm.$^{-1}$ |
| 3AgI—KAg(CN)$_2$ | 6.7×10$^{-2}$ ohm$^{-1}$ cm.$^{-1}$ |
| 4AgI—KAg(CN)$_2$ | 1.2×10$^{-1}$ ohm$^{-1}$ cm.$^{-1}$ |
| 9AgI—KAg(CN)$_2$ | 3.8×10$^{-2}$ ohm$^{-1}$ cm.$^{-1}$ |
| 19AgI—KAg(CN)$_2$ | 4.5×10$^{-3}$ ohm$^{-1}$ cm.$^{-1}$ |

As can be seen from this table the specific conductance of various compositions can be modified by changing the proportion of silver iodide present while maintaining the proportions of potassium cyanide and silver cyanide constant in a 1:1 mole ratio. The specific conductance of compositions falling along the silver iodide-potassium cyanide axis of the ternary further demonstrates the flexibility of this system and is exemplified by the following table:

TABLE 2

| Composition (mole percent) | | Specific conductance (ohm$^{-2}$ cm.$^{-1}$ at 25° C.) |
|---|---|---|
| AgI | KCN | |
| 95 | 5 | 2.9×10$^{-3}$ |
| 90 | 10 | 3.20×10$^{-2}$ |
| 82.5 | 17.5 | 9.5×10$^{-2}$ |
| 80 | 20 | 1.40×10$^{-1}$ |
| 75 | 25 | 9.34×10$^{-2}$ |
| 70 | 30 | 6.31×10$^{-2}$ |
| 65 | 35 | 4.10×10$^{-2}$ |
| 62.5 | 37.5 | 3.62×10$^{-2}$ |
| 60 | 40 | 3.23×10$^{-2}$ |
| 55 | 45 | 1.00×10$^{-2}$ |
| 50 | 50 | 3.5×10$^{-3}$ |

In general, compositions in the ternary diagram of silver iodide, potassium cyanide and silver cyanide which exhibit specific conductances sufficiently high to permit use in practical applications as solid ionic conductors onform to the compositions expressed by the formula $$xAgI\text{—}yKCN\text{—}zAgCN$$

wherein $x$ ranges from 0.45 to 0.95 mole, $y$ is 1 minus $x$ mole and the ratio of $y/z$ ranges from infinity to 1, or wherein $x$ ranges from 0.45 to 0.95 mole, $z$ is 1 minus $x$ mole and the ratio of $y/z$ ranges from 1 to ⅛. For example, if $x$ is 0.80 mole, $y$ is 0.20 mole and $y/z$ is infinity, the composition 4AgI—KCN is expressed. Also, when $x$ is 0.80 mole, $y$ is 0.20 mole and $y/z$ is 1, the composition 4AgI—KAg(CN)$_2$ is expressed. Likewise, when $x$ is 0.50 mole, $z$ is 0.50 mole and $y/z$ is ⅛ the composition 5AgI—4AgCN—KAg(CN)$_2$ is obtained. In the preferred compositions $x$ is 0.80 mole and $y/z$ ranges from infinity to 1.

The relations expressed in the formula set forth above are also true for the monorubidium and monocesium salts in which instances the $y$ term of the formula would be rubidium cyanide or cesium cyanide, respectively. The numerical values expressed for the potassium salt are also correct for the rubidium and cesium salts.

The compounds of the present invention are particularly well suited for use as battery electrolytes since they readily transport silver ions and have specific conductances sufficiently high to permit fabrication of batteries having voltages and currents within the ranges required for practical use. The compounds can be easily prepared in a controlled atmosphere and are more stable than compounds which have heretofore been available.

The greater stability of the compounds of the present invention was demonstrated by means of differential thermal analysis. The method used in this comparison involved introducing a known vapor pressure of water into a closed system containing the solid ionic conductors. Differential thermal analysis of the compounds was performed and showed endothermic peaks indicating decomposition in each solid ionic conductor previously available while far fewer peaks appeared in the same time with monopotassium tetrasilver tetraiodide monocyanide and virtually no decomposition was observed with monorubidium tetrasilver tetraiodide monocyanide under identical test conditions.

The preparation of the compounds of the present invention and their use in battery applications will be described in more detail in the following examples which are merely illustrative and are not intended, in any manner, to be limitative of the present invention:

Example 1

Monopotassium tetrasilver tetraiodide monocyanide was prepared by reacting 20 mole percent potassium cyanide with 80 mole percent silver iodide in an atmosphere of dry argon. The potassium cyanide and silver iodide were powdered and dried. A mixture of 0.65 gram of potassium cyanide and 9.35 grams of silver iodide was placed in a Pyrex tube which had been flushed with dry argon for about 2 hours. After the tube and contents were held at 180° C. for 16 hours, the temperature was raised to 495° C. and maintained for 1 hour. At the end of this period the tube and contents were quenched to room temperature in a blast of cold air.

The resulting material was a gray-green mass. The tube and contents were then sealed off and transferred to a dry box where the material was powdered in an agate mortar. The X-ray pattern of this material is compared with silver iodide in the following table:

TABLE 3.—X-RAY POWDER PATTERN ANALYSIS

| KAg$_4$I$_4$CN | | β-AgI | |
|---|---|---|---|
| d | I | d | I |
| 7.9 | S | | Absent |
| 3.99 | M | 3.98 | M |
| 3.77 | M | 3.75 | S |
| 3.74 | S | | Absent |
| 3.53 | M | 3.51 | M |
| 3.37 | S | | Absent |
| 3.23 | W | | Absent |
| 2.98 | VW | | Absent |
| 2.79 | VW | 2.73 | W |
| 2.71 | VW | | Absent |
| 2.63 | MW | | Absent |
| 2.56 | VW | | Absent |
| 2.50 | W | | Absent |
| 2.38 | W | | Absent |
| 2.30 | M | 2.296 | S |
| 2.23 | MW | | Absent |
| 2.19 | S | | Absent |
| 2.12 | MW | 2.119 | MW |
| 2.07 | M | | Absent |
| 2.04 | MW | | Absent |
| 1.96 | M | 1.96 | M |
| 1.94 | VW | | Absent |

The "$d$" values recited in Table 3 refer to characteristic interatomic spacings and the I values refer to the intensity of the peaks found at the specified "$d$" value, S being strong, M being medium, W being weak and VW being very weak. The presence and intensity of peaks indicates that a particular molecular structure is present and the presence of several peaks of equal intensity at the same "$d$" values would indicate the presence of identical compounds.

When Table 3 is examined, it is found that although certain lines are common to monopotassium tetrasilver tetraiodide monocyanide and silver iodide, there are strong lines in the potassium compound at "$d$" values of 7.9, 3.74, 3.37 and 2.19 which are absent in the silver iodide pattern and indicate that monopotassium tetrasilver tetraiodide monocyanide is not simply a disordered or contaminated silver iodide but is rather a separate and unique material.

The specific resistance of this compound was 7.1 ohm·cm. and the specific conductance at 25° C. was 1.4×10$^{-1}$ ohm$^{-1}$ cm.$^{-1}$. The wholly ionic nature of the conductance exhibited by monopotassium tetrasilver tetraiodide monocyanide at 25° C. was demonstrated by electrolyzing the material between silver electrodes. The anode loss was equal to the cathode gain and the amount of silver transported was in accord with Faraday's Laws.

Example 2

Monopotassium tetrasilver tetraiodide monocyanide was also prepared, according to the procedure described in Example 1, by reacting 1 mole of potassium iodide with 1 mole of silver cyanide and 3 moles of silver iodide. The compound was also formed by reacting 1 mole of monopotassium monosilver dicyanide with 1 mole of potassium iodide and 7 moles of silver iodide. In both of these cases, a material identical in all respects to that produced in Example 1 was obtained.

Example 3

Monorubidium tetrasilver tetraiodide monocyanide was prepared by fusion of an intimate mixture of 1 mole of rubidium iodide, 1 mole of silver cyanide and 3 moles of silver iodide followed by rapid quenching of the melt to room temperature.

Each reactant was dried by heating to 200° C. in an atmosphere of dry nitrogen for 2 hours before being used. The desired 1:1:3 mole ratio of the rubidium iodide, silver cyanide and silver iodide, respectively, was weighed out and intimately ground together. This mixture was transferred to a reaction tube which was placed in an electric furnace. After the tube was flushed with dry nitrogen for 1 hour, the reactants were heated slowly to 130° C. and allowed to remain at this temperature for 66 hours. The temperature was then raised to 400° C. gradually over a period of ½ hour. At this temperature the melt is red-brown in color. It was next quenched by plunging the reaction tube into liquid nitrogen. The resulting solid, after grinding, is creamy-yellow in color.

Monorubidium tetrasilver tetraiodide monocyanide was found to be more stable than monopotassium tetrasilver tetraiodide monocyanide in the presence of moisture normally present in air. The potassium salt gains weight in air and displays significant changes in its X-ray diffraction powder pattern following exposure to this environment. The rubidium salt, on the other hand, shows no such major changes in its X-ray diffraction powder pattern even after 6 weeks exposure to air. The greater stability of the rubidium salt was further confirmed by differential thermal analysis.

Example 4

Monopotassium monorubidium octosilver octoiodide dicyanide was prepared by thermal fusion of 1 mole of rubidium iodide, 1 mole of monopotassium monosilver dicyanide and 7 moles of silver iodide in an atmosphere of dry nitrogen followed by rapid quenching of the melt to room temperature. When the resulting solid is ground to a powder, it is gray in color and displays a specific conductance of 0.15 ohm$^{-1}$ cm.$^{-1}$. The X-ray diffraction powder pattern of this compound compared with that of monorubidium tetrasilver tetraiodide monocyanide shows some similarities but definite differences are also evident indicating the formation of a new compound rather than merely a contamination of the monorubidium tetrasilver tetraiodide monocyanide.

Example 5

A solid state cell utilizing monopotassium tetrasilver tetraiodide monocyanide as the solid state electrolyte was assembled. The anode was silver metal and the cathode was a mixture of iodine and carbon in a ratio of 4:1, respectively. The cell as an open circuit voltage of 0.68 volt and discharge at the rate of 0.14 milliampere per sq. in. was possible for short periods of time.

It will be obvious to those skilled in the art that the solid ionic conductors of the present invention will have applications in battery constructions where silver iodide or other solid ionic conductors have heretofore been used and will be useful in devices other than batteries where compounds of this general type have heretofore been used. For example, silver iodide salts have traditionally been suitable materials for photographic purposes and the fact that the conductors of the present invention readily transport silver ions should make them suitable for photographic use. Likewise, other materials of cell construction, e.g. various cathodic materials, may be substituted for the iodine-carbon cathode of Example 5. In fact, any compatible iodine or bromine releasing composition may be used in combination with the electrolytes of the present invention. Moreover, while the present invention has been described with reference to many particular details thereof, it is not intended that these details shall be construed as limiting the scope of the invention.

What is claimed is:
1. A compound of the general formula

$$MCN \cdot 4AgI$$

2. A compound according to claim 1 where M is potassium.
3. A compound according to claim 1 wherein M is rubidium.
4. A compound according to claim 1 wherein M is cesium.
5. A compound according to claim 1 wherein M is a mixture of ½ mole of potassium and ½ mole of rubidium.

References Cited
UNITED STATES PATENTS

| | | | |
|---|---|---|---|
| 3,443,997 | 5/1969 | Argue et al. | 136—83 |
| 3,476,606 | 11/1969 | Owens | 136—83 |

WINSTON A. DOUGLAS, Primary Examiner

C. F. LEFEVOUR, Assistant Examiner

U.S. Cl. X.R.

23—79, 87, 367; 136—153

UNITED STATES PATENT OFFICE
CERTIFICATE OF CORRECTION

Patent No. 3,582,291　　　　　　　　Dated June 1, 1971

Inventor(s) Geoffrey W. Mellors

It is certified that error appears in the above-identified patent and that said Letters Patent are hereby corrected as shown below:

Column 6, after line 35 insert --wherein M is potassium, rubidium, cesium or mixtures thereof.--

Signed and sealed this 7th day of September 1971.

(SEAL)
Attest:

EDWARD M. FLETCHER, JR.
Attesting Officer

ROBERT GOTTSCHALK
Acting Commissioner of Patents